United States Patent
Li

(10) Patent No.: US 6,483,941 B1
(45) Date of Patent: Nov. 19, 2002

(54) CROMINANCE CHANNEL OVERSHOOT CONTROL IN IMAGE ENHANCEMENT

(75) Inventor: Xing Li, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/393,534

(22) Filed: Sep. 10, 1999

(51) Int. Cl.$^7$ .............................. H04N 1/46; G06K 9/00
(52) U.S. Cl. ...................................... 382/167; 358/518
(58) Field of Search ................................ 382/167, 232; 358/518, 504, 520, 530

(56) References Cited

U.S. PATENT DOCUMENTS

| | | | |
|---|---|---|---|
| 5,619,347 A | * 4/1997 | Taniguchi | 358/516 |
| 5,666,443 A | 9/1997 | Kumashiro | 382/266 |
| 5,887,125 A | * 3/1999 | Takano | 395/111 |

FOREIGN PATENT DOCUMENTS

EP 0 286 286 A1 * 12/1988 ............ H04N/1/41

* cited by examiner

*Primary Examiner*—Jerome Grant, II
(74) *Attorney, Agent, or Firm*—Fay, Sharpe, Fagan, Minnich & McKee, LLP

(57) ABSTRACT

A method and apparatus for digital image processing are provided for controlling chrominance channel overshoot in response to FIR or other enhancement processing. The chrominance values defining the enhanced digital image data for each pixel are compared to corresponding local minimum and maximum chrominance values of the non-enhanced image obtained from the neighborhood of the subject pixel. If an enhanced chrominance value for a subject pixel falls outside the corresponding local minimum/local maximum chrominance range by an overshoot amount, the enhanced chrominance value is adjusted to reduce the overshoot amount. The overshoot amount is adjusted according to a pre-programmed overshoot reduction parameter.

17 Claims, 5 Drawing Sheets

CROMINANCE CHANNEL OVERSHOOT CONTROL IN IMAGE ENHANCEMENT

BACKGROUND OF THE INVENTION

The present invention relates to the digital image processing arts. In particular, it relates to enhancement of digital image data, and a method and apparatus for controlling overshoot in the chrominance channel when edge enhancement operations are performed. Thus, the present invention provides a method and apparatus for reducing color fringing due to edge enhancement operations without compromising resulting edge sharpness.

A main advantage of digital image reproduction relative to traditional light-lens image reproduction resides in the ability to process the digital image data so as to enhance the appearance of the final output image. For example, digital filtering is often performed to sharpen edges and fine lines for purposes of making an output image more visually appealing. When reducing or scaling-down an image, pre-filtering is often performed prior to sub-sampling for purposes of anti-aliasing. Due to limitations of the filtering algorithm, this filtering operation can blur an image. Also, in color image reproduction, it is a common practice to sub-sample the chrominance information to reduce the number of bits necessary to represent an image. This, too, can result in blurred edges. In either case and others, edge enhancement of the filtered image can be performed to sharpen the final output image.

One drawback associated with conventional edge enhancement operations is that the chrominance information can be altered significantly from its original value so that the color of the final output image is altered compared to the original image. This "color fringing" is, obviously, undesirable and must be controlled in order to provide an aesthetically pleasing final image. Heretofore, no effective method and apparatus have been provided for controlling chrominance channel overshoot due to image enhancement operations without compromising edge sharpness.

SUMMARY OF THE INVENTION

In accordance with the present invention, a new and improved method and apparatus are provided for chrominance channel overshoot control in image enhancement operations.

In accordance with a first aspect of the present invention, a method of digital image processing comprises receiving input digital image data defining a plurality of pixels of an input color digital image, the input digital image data including at least a first input chrominance value for each of the pixels of the input image. For each of the pixels of the input digital image, the input digital image data defining the pixel is enhanced based upon the input digital image data defining neighborhood pixels in a spatial neighborhood established about the pixel to obtain enhanced digital image data defining the pixel, the enhanced digital image data including at least a first enhanced chrominance value. For each of the pixels of the input digital image, an overshoot control operation is performed on the enhanced digital image data defining the pixel, the overshoot control operation including:

determining first local maximum and first local minimum first input chrominance values in a neighborhood about the pixel;
   comparing the first enhanced chrominance value to the first local maximum and first local minimum chrominance values to determine if the first enhanced pixel chrominance value is one of: (i) above the first local maximum chrominance value by a first overshoot amount; and, (ii) below the first local minimum chrominance value by a first overshoot amount;
   if the first enhanced chrominance value of the pixel is above the first local maximum chrominance value, reducing the first enhanced chrominance value to reduce the first overshoot amount; and,
   if the first enhanced chrominance value of the pixel is below the first local minimum chrominance value, increasing the first enhanced chrominance value to reduce the first overshoot amount.

In accordance with another aspect of the present invention, a method of enhancing a color digital image includes, for each of a plurality of pixels defining the color digital image, modifying a first chrominance value of a pixel in response to an enhancement filtering operation to obtain a modified first chrominance value for the pixel. Within a neighborhood of pixels spatially near the pixel, identifying a local minimum and a local maximum first chrominance value of the pixels within the neighborhood. The modified first chrominance value is compared to at least one of the local minimum and local maximum first chrominance values and, if the modified first chrominance value is greater than the local maximum first chrominance value, the modified first chrominance value of the pixel is reduced by a select percentage of the amount by which the modified first chrominance value exceeds the local maximum first chrominance value. If the modified first chrominance value is less than the local minimum first chrominance value, the modified first chrominance value of the pixel is increased by a select percentage of the amount by which the modified first chrominance value is less than said local minimum first chrominance value.

In accordance with still another aspect of the present invention, a digital image processing apparatus includes means for receiving input digital image data defining a plurality of pixels of an input color digital image, the input digital image data including an input chrominance value for each of the pixels of the input image. The apparatus also includes means for enhancing the input digital image data defining each of the pixels based upon the input digital image data defining neighborhood pixels in a spatial neighborhood established about each of the pixels to obtain enhanced digital image data defining each of the pixels, the enhanced digital image data including an enhanced chrominance value. A means is provided for performing an overshoot control operation on the enhanced digital image data defining each of the pixels, and includes:

means for determining a local maximum and a local minimum input chrominance value in a neighborhood about a select pixel;
   means for comparing the enhanced chrominance value to the local maximum and local minimum chrominance values to determine if the enhanced pixel chrominance value is one of: (i) above the local maximum chrominance value by an overshoot amount; and, (ii) below the local minimum chrominance value by an overshoot amount;
   means for reducing the enhanced chrominance value to reduce the overshoot amount if the enhanced chrominance value of the select pixel is above the local maximum chrominance value; and,
   means for increasing the enhanced chrominance value to reduce the overshoot amount if the enhanced chrominance value of the select pixel is below the local minimum chrominance value.

In accordance with yet another aspect of the present invention, a method of controlling chrominance channel overshoot includes receiving a plurality of pixels of digital image data, each pixel defined in terms of an original luminance value and first and second original chrominance values. The digital image data are enhanced to convert each pixel of the image into an enhanced pixel defined in terms of an enhanced luminance value and first and second enhanced chrominance values. Local minimum and local maximum first original chrominance values associated with each enhanced pixel in a select neighborhood about each of the enhanced pixels are determined. Local minimum and local maximum second chrominance values associated with each enhanced pixel in a select neighborhood about each of the enhanced pixels are determined. For each enhanced pixel, the first and second enhanced chrominance values associated with the enhanced pixel are compared to the local maximum and local minimum first and second original chrominance values, respectively, to determine: (i) if the first enhanced chrominance value overshoots one of the local maximum and local minimum first original chrominance values by a first overshoot amount; or (ii) if the second enhanced chrominance value overshoots one of the local maximum and local minimum second original chrominance values by a second overshoot amount. For each enhanced pixel, if the first enhanced chrominance value overshoots one of the local maximum and local minimum first original chrominance values, the first enhanced chrominance value is adjusted to reduce the first overshoot amount. Likewise, for each enhanced pixel, if the second enhanced chrominance value overshoots one of the local maximum and local minimum second original chrominance values, the second enhanced chrominance value is adjusted to reduce the second overshoot amount.

One advantage of the present invention is the provision of a method and apparatus for chrominance channel overshoot control during digital image processing enhancement operations.

Another advantage of the present invention resides in the provision of a method and apparatus for controlling chrominance channel overshoot resulting from edge enhancement processing wherein color fringing is reduced without compromising edge sharpness.

A further advantage of the present invention is found in the provision of a method and apparatus for reducing chrominance channel overshoot using original min/max chrominance values from pixels in the neighborhood surrounding a pixel being processed.

Still other benefits and advantages of the present invention will become apparent to those of ordinary skill of the art to which the invention pertains upon reading and understanding the present specification.

BRIEF DESCRIPTION OF THE DRAWINGS

The present invention may take form in various components and arrangements of components, and in various steps and arrangements of steps, preferred embodiments of which are disclosed herein and illustrated in the accompanying drawings which form a part hereof and wherein.

DETAILED DESCRIPTION OF THE PREFERRED EMBODIMENTS

Figure 1:
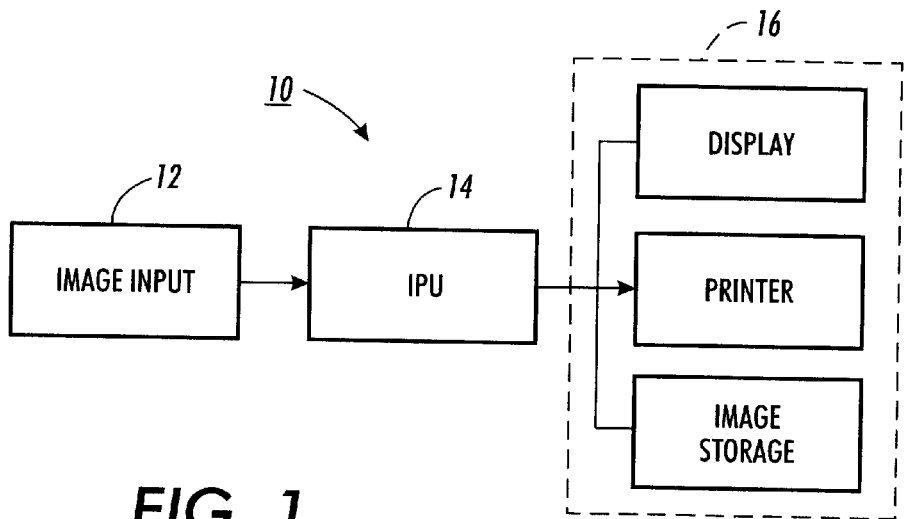
FIG. 1 is a diagrammatic illustration of a digital image processing system formed in accordance with the present invention.

Referring now to the drawings wherein the showings are for purposes of describing preferred embodiments of the invention only and not for purposes of limiting same, a digital image processing system 10 formed in accordance with the present invention is shown in FIG. 1. An image input unit 12, such as a scanner, image storage device, and/or computer image generator derives/delivers digital image data in the form of one or more monochromatic separations, wherein the picture elements or pixels of each separation are defined at a depth of d bits per pixel where d is an integer. Accordingly, each pixel of each separation is defined in terms of d bits per pixel (bit depth=d), and each pixel has some gray value between full off and full on. When the digital image data is provided in terms of a single monochromatic separation, the image is monochromatic, for example, so called black-and-white image data. On the other hand, when the digital image data is provided in terms of two or more monochromatic separations, a color image results when the data from the separations is combined, for example, red-green-blue (RGB) separations or cyan-magenta-yellow (CMY) separations. Color digital image data supplied by the image input unit 12 can alternatively be supplied in the form of a luminance-chrominance color space, such as CIELAB or the like, as is well known in the art, and conversion among various color spaces is also contemplated herein.

The digital image signals are input from the scanner 12 to an image processing unit 14 wherein digital image processing, such as edge enhancement with chrominance channel overshoot control in accordance with the present invention, is performed. The image processing unit 14 may be provided by any suitable electronic computing apparatus such as a programmed general purpose computer, a dedicated electronic circuit, or any other suitable electronic circuit means. The image processing unit 14 outputs processed digital image data in a suitable format to an image output terminal 16, such as a storage device, a digital printer, and/or a visual display. Suitable apparatus for digital image input and/or output include the XEROX Document Center 265DC digital imaging system, Pixelcraft 7650 Pro Imager Scanner, XEROX DocuTech Production Printing System scanners, the XEROX 5775 digital color copier, the XEROX 5760 and 5765 Majestik digital color copiers, or any other suitable color digital scanner/copier. Regardless of the depth d at which each pixel is defined, the location of each pixel in each separation bitmap is also defined, typically in terms of a row "n" and a column "m."

Figure 2:
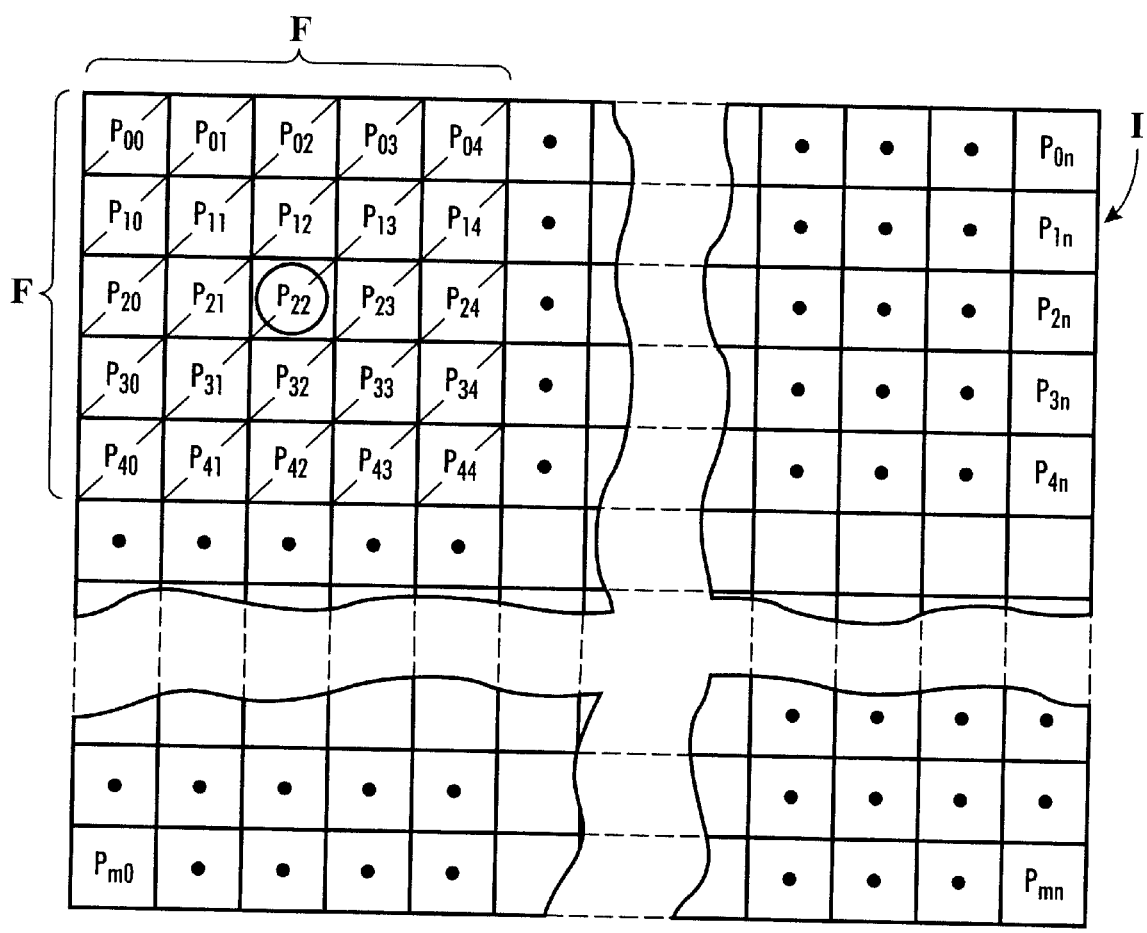
FIG. 2 is an illustration of a digital image wherein a portion of the digital image is subject to edge enhancement filtering.

FIG. 2 illustrates a color digital image I as derived by the image input terminal 12. As described above, the image I comprises a plurality of pixels P arranged in m rows and n columns so that each pixel P is uniquely identifiable by a row/column designation mn, e.g., $P_{22}$ which represents the pixel P located in the third row and third column. As noted, each pixel P of a color digital image I is defined by several monochromatic gray values or in terms of its luminance and chrominance values depending upon the color space.

For convenience and ease of understanding the present invention, the invention will be described in terms of the pixels P being defined in the CIELAB color space. As is generally known in the art, CIELAB is a perceptual color space wherein color is represented in three dimensions according to a lightness value (represented on the L* axis), a redness-greenness value (represented on the a* axis), and a yellowness-blueness value (represented on the b* axis). Thus, the a* and b* chrominance values define first and second chrominance channels for the CIELAB color space. However, those of ordinary skill in the art will certainly recognize that the invention can be carried out in any luminance-chrominance color space and that any other color space, such as RGB, CMYK, or the like is freely convertible into CIELAB or another luminance-chrominance color space. It is not intended that the invention be limited to any particular color space.

With continuing reference to FIG. 2, the cross-hatched area F represents a spatial filter as is also well known in the art of digital image processing. In particular, the represented filter F is a finite impulse response (FIR) filter that alters the value of a centrally located subject pixel P based upon the original values of all other neighborhood pixels P, i.e., all other pixels P encompassed by the filter F at a given time. The contribution of each neighborhood pixel to the final value of the subject pixel P varies depending upon the weight assigned to that neighborhood pixel according to the particular filtering operation being performed.

As illustrated in FIG. 2, by way of example only, the filter F is an FIR edge enhancement filter of a size that is 5 pixels by 5 pixels (5×5). The central pixel $P_{22}$ is the subject pixel, and the remaining pixels P encompassed by the filter are the neighborhood pixels that will be used to alter the value of the subject pixel $P_{22}$ for purposes of edge or other enhancement. As is well known, the filter F is applied to each pixel P in the image I for image enhancement operations. The FIR filtering operation, itself, is conventional and does not form a part of the present invention. Thus, any other size/type of FIR or other edge enhancement filter may be used without departing from the overall scope and intent of the present invention.

Figure 3:
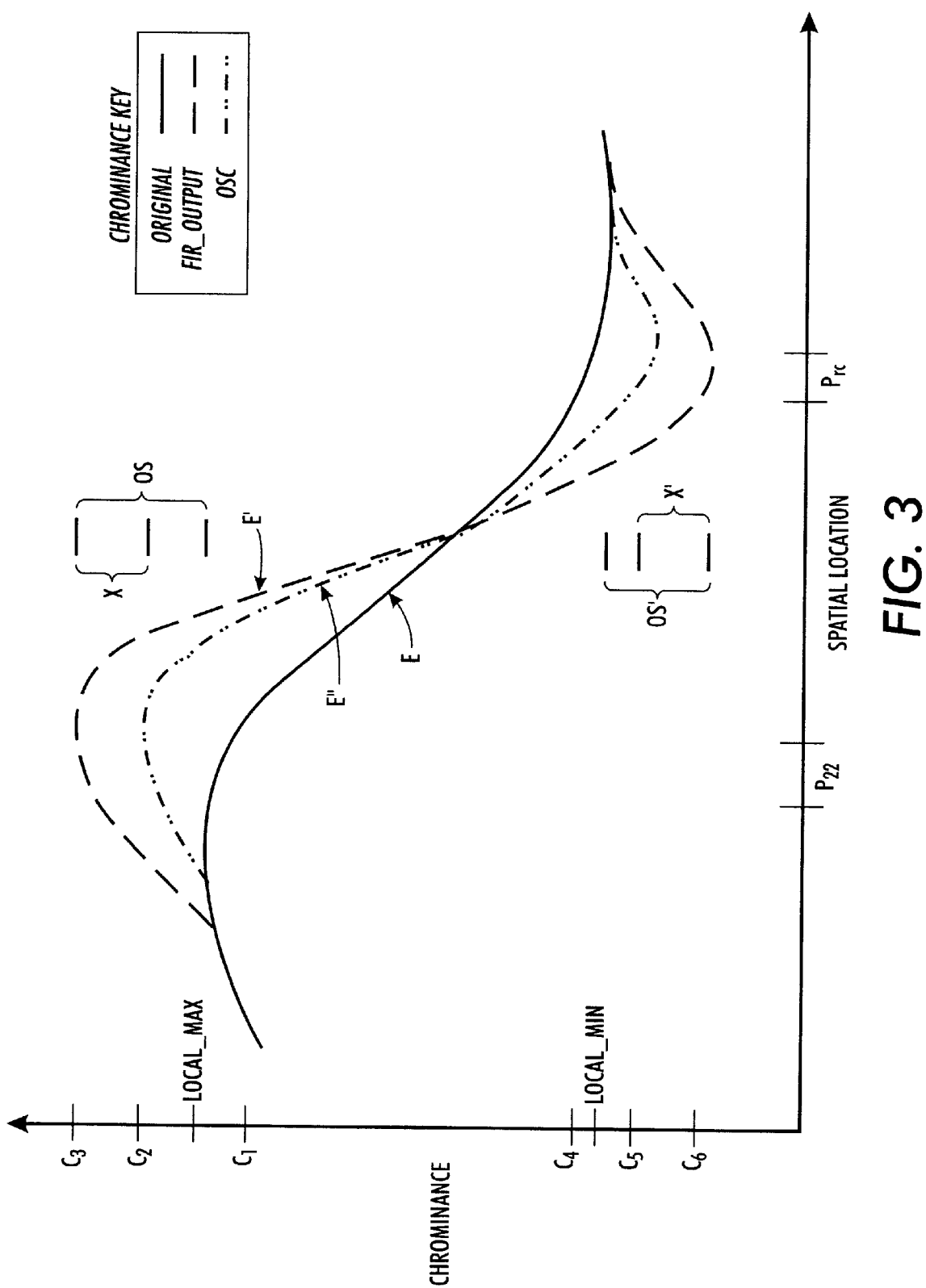
FIG. 3 graphically illustrates chrominance channel overshoot and control of same in accordance with the present invention.

FIG. 3 graphically illustrates chrominance channel overshoot in response to FIR filtering and control of same in accordance with the present invention. The solid line represents chrominance values of the unfiltered image data I for each pixel P, e.g., in the CIELAB color space, the solid line represents either the a* or b* chrominance channel. It can be seen that, in an edge region E of the image I, the chrominance values change from a higher level to a lower level. However, this change in chrominance values is gradual and. the edge region E of the image I is, thus, not well defined or "sharp." To make the image I more visually appealing, FIR filtering is carried out on the original image I to enhance the edge region E and other edge regions.

As is graphically illustrated with a broken line labeled FIR_OUTPUT, after FIR filtering, the transition from a higher chrominance to a lower chrominance in the edge region of the image I is much steeper indicating a much sharper, enhanced edge region E'. However, with reference to the pixel $P_{22}$ as an example, its chrominance value has been raised from an original value $C_1$ to an FIR_OUTPUT value of $C_3$. Further, the FIR_OUTPUT chrominance value of the pixel $P_{22}$ exceeds a local maximum original chrominance value LOCAL_MAX of pixels P in a neighborhood about the pixel $P_{22}$ by an overshoot amount OS. The neighborhood about the pixel $P_{22}$ used to identify LOCAL_MAX preferably corresponds to the neighborhood of the filter F, or a subset of same, but may be any other neighborhood in the region of the subject pixel, in this case the pixel $P_{22}$. Accordingly, the chrominance of the pixel $P_{22}$ has been altered significantly relative to surrounding pixels, and the appearance of the output image will likewise be altered due to color shift or "fringing" of the pixel $P_{22}$.

Similarly, with reference to the pixel $P_{rc}$, the FIR filtering operation has caused its chrominance value to be reduced from $C_4$ to an FIR_OUTPUT value $C_6$. Also, the FIR_OUTPUT chrominance value is less than a local minimum chrominance value LOCAL_MIN of pixels P in the neighborhood of the pixel $P_{rc}$ by an overshoot amount OS'. Again, the neighborhood used to locate the local minimum chrominance value LOCAL_MIN preferably corresponds to the neighborhood of the FIR filter, itself, or a subset thereof, but may be any other neighborhood in the region of the subject pixel, in this case the pixel $P_{rc}$. Thus, the chrominance value of the pixel $P_{rc}$ has also been altered in a manner that will sharpen the edge E but cause undesired color shift or fringing relative to the appearance of the original image I.

With continuing reference to FIG. 3, it is shown that chrominance channel overshoot control in accordance with the present invention attenuates chrominance channel overshoot OS,OS'. The phantom line OSC represents the pixel chrominance values P for the same edge region at E" after performance of chrominance channel overshoot control in accordance with the present invention. It is shown that, the overshoot OS associated with of the pixel $P_{22}$ is reduced by an amount X=OS *f, wherein, f is a programmable overshoot reduction parameter that can be pre-set or that can vary depending upon the characteristics of the input image I and/or the desired aesthetics of the image output to the image output terminal 16. Likewise, the overshoot OS' of the pixel $P_{rc}$ is reduced via overshoot control in accordance with the present invention by an amount X'=OS'*f. However, it is significant to note that the phantom line OSC representing the same edge region at E" after overshoot control in accordance with the present invention is nearly as steep as the broken line FIR_OUTPUT representing the edge region E' after FIR edge enhancement. Thus, it can be seen that overshoot control in accordance with the present invention reduces color fringing without significantly compromising edge enhancement or sharpness.

In general, chrominance channel overshoot control in accordance with the present invention to obtain a final output chrominance value OSC based upon an input chrominance value FIR_OUTPUT provided after FIR or other edge enhancement operations can be described mathematically by the following:

| | |
|---|---|
| OS = | FIR_OUTPUT – LOCAL_MAX |
| OS' = | LOCAL_MIN – FIR_OUTPUT |
| OSC = | FIR_OUTPUT – f * OS |
| | if FIR_OUTPUT > LOCAL_MAX; |
| OSC = | FIR_OUTPUT + f * OS' |
| | if FIR_OUTPUT < LOCAL_MIN; and, |

-continued $$OSC = FIR\_OUTPUT$$
$$\text{if LOCAL\_MIN} <= FIR\_OUTPUT <= LOCAL\_MAX,$$

again, wherein f is programmable chrominance overshoot reduction parameter as noted above. Thus, the amount of overshoot control varies depending upon the value selected for the parameter f. For example, if f=0.25, the overshoot OS,OS' will be reduced by 25%. Thus, the effects of the FIR enhancement operation are decreased by 25% to prevent undesired color fringing. It is contemplated within the scope of the present invention to change the value for the overshoot reduction parameter f depending upon whether the overshoot to be attenuated is "positive" (FIR_OUTPUT>LOCAL_MAX) as illustrated in FIG. 3 at OS, or "negative" (FIR_OUTPUT<LOCAL_MIN) as illustrated in FIG. 3 at OS', as either positive or negative overshoot may be deemed more or less objectionable than the other in certain digital image processing operations.

Figure 4:
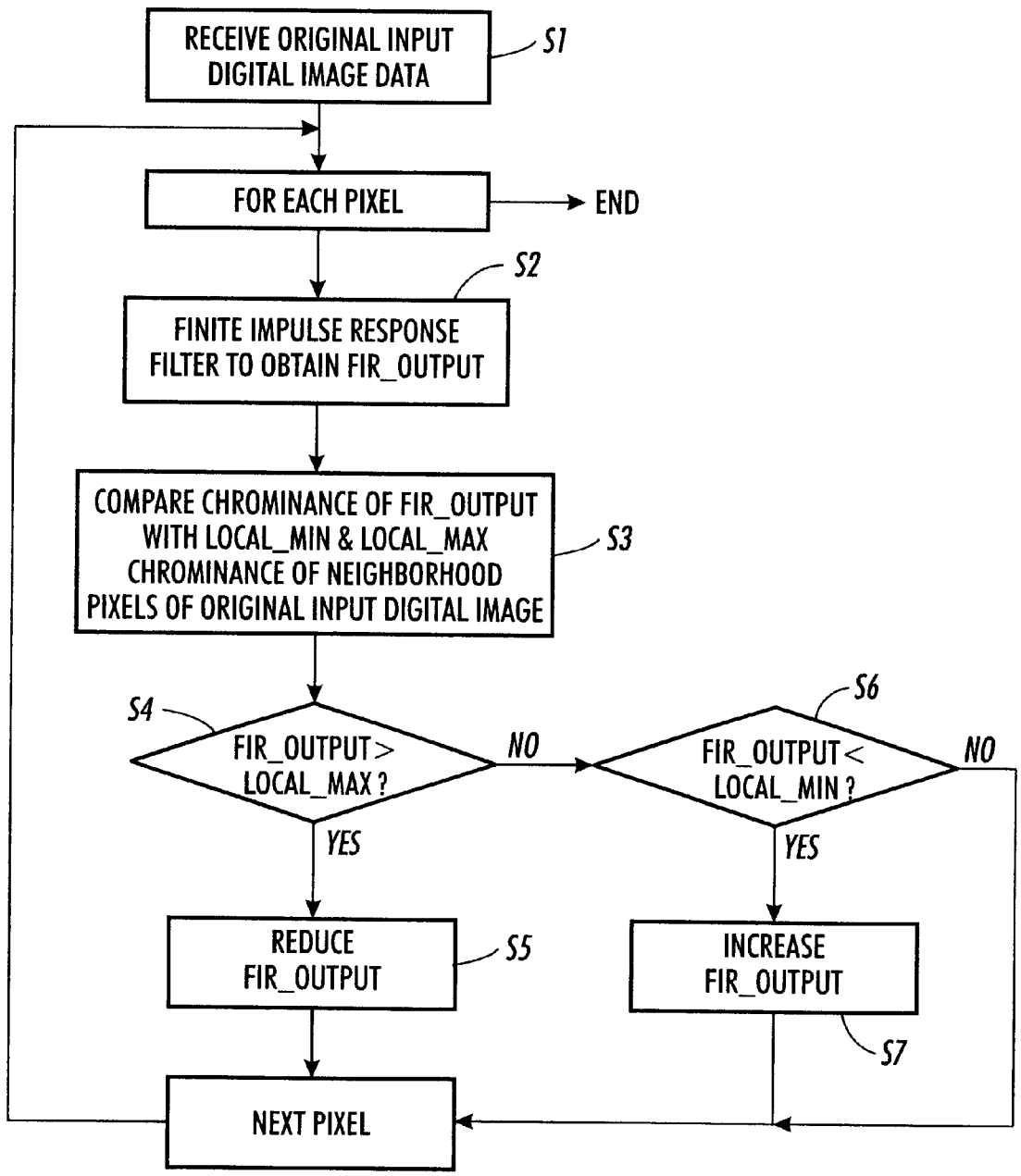
FIG. 4 is a flow chart that illustrates edge enhancement with chrominance channel overshoot control in accordance with the present invention.

Referring now to FIG. 4, chrominance channel overshoot control in accordance with the present invention is described. A step or means SI receives the digital. image data of an original image I. For each pixel P of the original image, a step or means S2 enhances the image data defining the pixel P using FIR or other edge enhancement filtering. Also for each pixel P of the original image, a step or means S3 compares the chrominance of the enhanced data defining the pixel P with original (non-enhanced) LOCAL_MIN/LOCAL_MAX chrominance values of other pixels in a neighborhood about the enhanced pixel P.

A step or means S4 determines if the chrominance of the enhanced pixel is greater than LOCAL_MAX and, if so, a step or means S5 reduces the chrominance of the enhanced pixel P as described above according to the overshoot reduction parameter f. On the other hand, if the chrominance of the enhanced pixel P is less than LOCAL_MAX, a step or means S6 determines if the chrominance of the enhanced pixel P is less than LOCAL_MIN and, if so, a step or means S7 increases the chrominance of the enhanced pixel P as described above according to the overshoot reduction parameter f.

Figure 5:
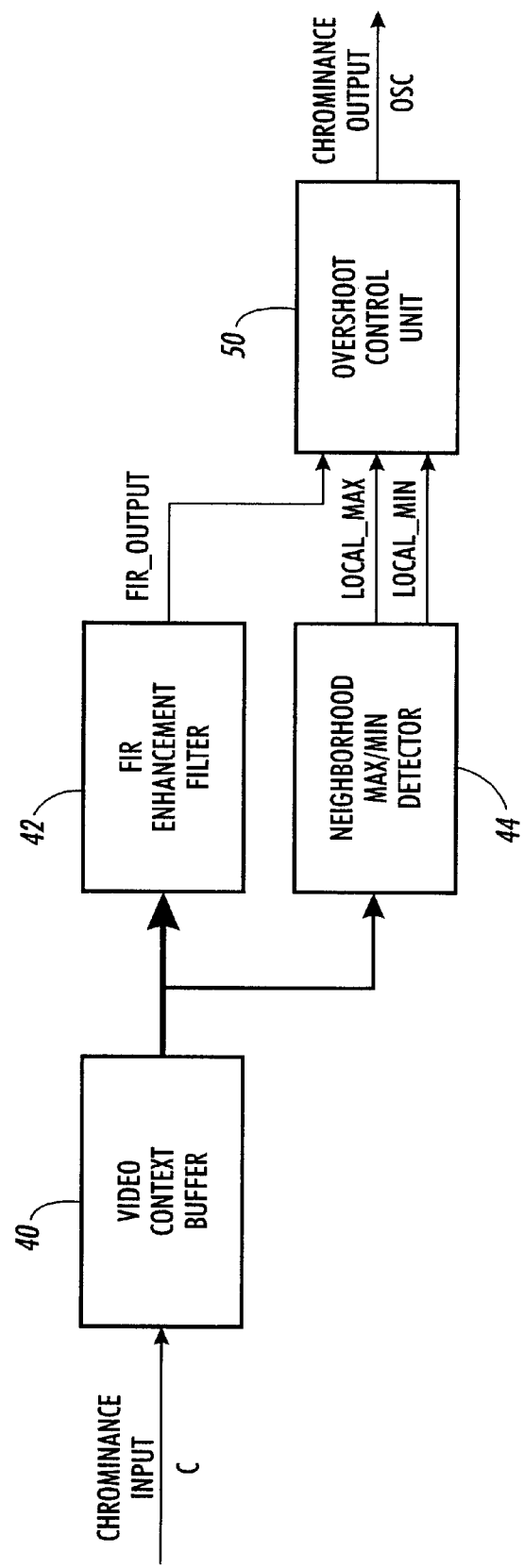
FIG. 5 is a block diagram illustrating a chrominance channel overshoot apparatus formed in accordance with the present invention.
Figure 6:
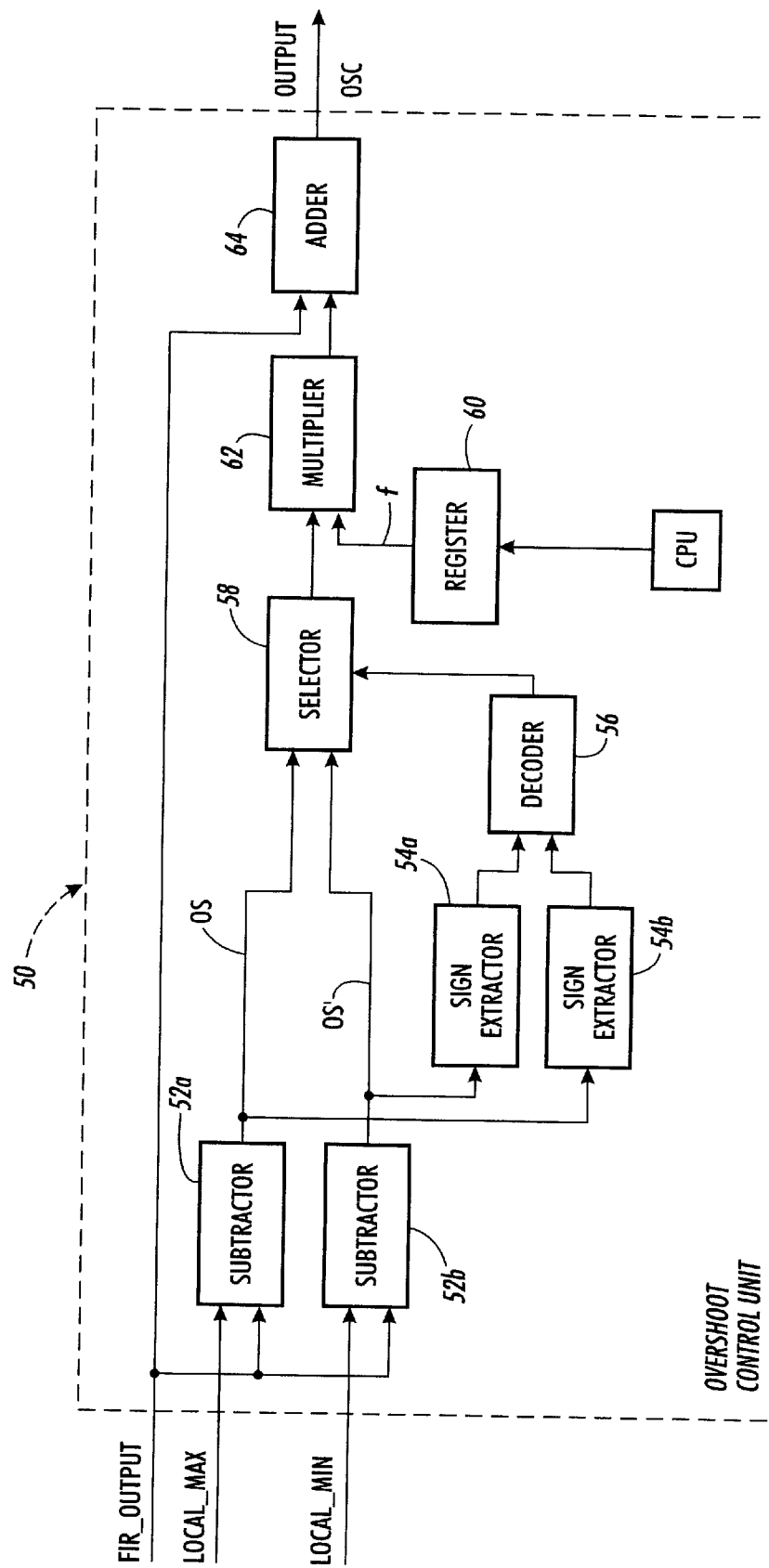
FIG. 6 is a block diagram illustrating the overshoot control unit of the apparatus shown in FIG. 5 as used for controlling chrominance channel overshoot in accordance with the present invention.

FIGS. 5 and 6 diagrammatically illustrate an apparatus specifically adapted for performing edge enhancement with chrominance channel overshoot control in accordance with the present invention. As noted above, those of ordinary skill in the art will recognize that the apparatus illustrated in FIGS. 5 and 6 is preferably the image processing unit 14, programmed or otherwise configured to provide structure and/or operations necessary for the subject invention. Chrominance input values C such as CIELAB a* and/or b* values, are input to a buffer 40. Preferably, each chrominance channel a*,b* employs an overshoot control system formed in accordance with the present invention as described herein.

An FIR edge enhancement filter 42 performs the edge enhancement step S2 and a neighborhood min/max detector 44 determines the values for LOCAL_MIN and LOCAL_MAX. An overshoot control unit 50 performs chrominance channel overshoot control in accordance with the present invention, in particular, steps S3–S7, as appropriate, and supplies the resulting chrominance values OSC as output.

With particular reference to FIG. 6, the overshoot control unit 50 includes subtractors 52a,52b, sign extractors 54a, 54b, a decoder 56, and a selector 58 that perform the operations S3,S4,S6 as appropriate to determine if the chrominance value FIR_OUTPUT for an enhanced pixel P is greater than LOCAL_MAX, less than LOCAL_MIN, or between these values. The overshoot reduction parameter f is preferably preprogrammed stored in a register 60, and a central processing unit CPU causes same to be input to a multiplier 62, together with the overshoot data OS,OS' input from the subtractors 52a,52b to perform the above-described multiplication of the overshoot reduction parameter f with the overshoot values OS,OS'. An adder 64 adds the result supplied by the multiplier 62 to the enhanced chrominance value FIR_OUTPUT to complete the overshoot control operations S5,S7 and obtain the output chrominance value OSC.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments, what is claimed is:

1. A method of digital image processing comprising:
receiving input digital image data defining a plurality of pixels of an input color digital image, said input digital image data including at least a first input chrominance value for each of said pixels of said input image;
for each of said pixels of said input digital image, enhancing said input digital image data defining said pixel based upon the input digital image data defining neighborhood pixels in a spatial neighborhood established about said pixel to obtain enhanced digital image data defining said pixel, said enhanced digital image data including at least a first enhanced chrominance value;
for each of said pixels of said input digital image, performing an overshoot control operation on said enhanced digital image data defining said pixel, said overshoot control operation comprising:
determining first local maximum and first local minimum first input chrominance values in a neighborhood about the pixel;
comparing the first enhanced chrominance value to said first local maximum and first local minimum chrominance values to determine if said first enhanced pixel chrominance value is one of: (i) above the first local maximum chrominance value by a first overshoot amount; and, (ii) below the first local minimum chrominance value by a first overshoot amount;
if said first enhanced chrominance value of said pixel is above said first local maximum chrominance value, reducing said first enhanced chrominance value to reduce said first overshoot amount; and,
if said first enhanced chrominance value of said pixel is below said first local minimum chrominance value, increasing said first enhanced chrominance value to reduce said first overshoot amount.

2. The digital image processing method as set forth in claim 1, wherein said step of enhancing said digital image data of said input digital image comprises applying a finite impulse response (FIR) filter to said digital image data defining each pixel of said input digital image to sharpen edge regions of said input digital image.

3. The digital image processing method as set forth in claim 1, wherein said step of reducing said first enhanced chrominance value to reduce said first overshoot amount comprises:
multiplying said first overshoot amount by a select overshoot reduction parameter to obtain a first overshoot reduction amount; and, subtracting said first overshoot reduction amount from said first enhanced chrominance value.

4. The digital image processing method as set forth in claim 3, wherein said step of increasing said first enhanced chrominance value to reduce said first overshoot amount comprises:

multiplying said first overshoot amount by a select overshoot reduction parameter to obtain a first overshoot reduction amount; and, adding said first overshoot reduction amount to said first enhanced chrominance value.

5. The digital image processing method as set forth in claim 1, wherein said digital image data defining each of said pixels of said input digital image comprises a luminance value and first and second chrominance values, whereby in response to said step of enhancing said input digital image data, said enhanced digital image data includes a first enhanced chrominance value and a second enhanced chrominance value.

6. The digital image processing method as set forth in claim 5, wherein said overshoot control operation further comprises, for each of said pixels of said input digital image:

determining second local maximum and second local minimum second input chrominance values in a neighborhood about the pixel;

comparing the second enhanced chrominance value to said second local maximum and second local minimum chrominance values to determine if said second enhanced pixel chrominance value is one of: (i) above the second local maximum chrominance value by a second overshoot amount; and, (ii) below the second local minimum chrominance value by a second overshoot amount;

if said second enhanced chrominance value of said pixel is above said second local maximum chrominance value, reducing said second enhanced chrominance value to reduce said second overshoot amount; and, if said second enhanced chrominance value of said pixel is below said second local minimum chrominance value, increasing said second enhanced chrominance value to reduce said second overshoot amount.

7. The digital image processing method as set forth in claim 6 wherein said pixels of said input digital image are defined in a CIELAB color space.

8. A method of enhancing a color digital image comprising, for each of a plurality of pixels defining said color digital image:

modifying a first chrominance value of a pixel in response to an enhancement filtering operation to obtain a modified first chrominance value for the pixel;

within a neighborhood of pixels spatially near the pixel, identifying a local minimum and a local maximum first chrominance value of the pixels within the neighborhood;

comparing the modified first chrominance value to at least one of the local minimum and local maximum first chrominance values;

if said modified first chrominance value is greater than said local maximum first chrominance value, reducing said modified first chrominance value of said pixel by a select percentage of the amount by which said modified first chrominance value exceeds said local maximum first chrominance value; and, if said modified first chrominance value is less than said local minimum first chrominance value, increasing said modified first chrominance value of said pixel by a select percentage of the amount by which said modified first chrominance value is less than said local minimum first chrominance value.

9. The method of enhancing a digital color image as set forth in claim 8, wherein said enhancement filtering operation comprises a finite impulse response (FIR) filtering operation.

10. The method of enhancing a color digital image as set forth in claim 8 further comprising:

modifying a second chrominance value of the pixel in response to said enhancement filtering operation to obtain a modified second chrominance value for the pixel;

within a neighborhood of pixels spatially near the pixel, identifying a local minimum second chrominance value and a local maximum second chrominance value of the pixels within the neighborhood;

comparing the modified second chrominance value to at least one of the local minimum and local maximum second chrominance values;

if said modified second chrominance value is greater than said local maximum second chrominance value, reducing said modified second chrominance value of said pixel by a select percentage of the amount by which said modified second chrominance value exceeds said local maximum second chrominance value; and, if said modified second chrominance value is less than said local minimum second chrominance value, increasing said modified second chrominance value of said pixel by a select percentage of the amount by which said modified second chrominance value is less than said local minimum second chrominance value.

11. The method of enhancing a digital color image as set forth in claim 10, wherein the plurality of pixels of the digital image are each defined in terms of a luminance value and first and second chrominance values.

12. A digital image processing apparatus comprising:

means for receiving input digital image data defining a plurality of pixels of an input color digital image, said input digital image data including an input chrominance value for each of said pixels of said input image;

means for enhancing said input digital image data defining each of said pixels based upon the input digital image data defining neighborhood pixels in a spatial neighborhood established about each of said pixels to obtain enhanced digital image data defining each of said pixels, said enhanced digital image data including an enhanced chrominance value;

means for performing an overshoot control operation on said enhanced digital image data defining each of said pixels, said overshoot control operation means comprising:

means for determining a local maximum and a local minimum input chrominance value in a neighborhood about a select pixel;

means for comparing the enhanced chrominance value to the local maximum and local minimum chrominance values to determine if said enhanced pixel chrominance value is one of: (i) above the local maximum chrominance value by an overshoot amount; and, (ii) below the local minimum chrominance value by an overshoot amount;

means for reducing said enhanced chrominance value to reduce said overshoot amount if said enhanced chrominance value of said select pixel is above said local maximum chrominance value; and, means for increasing said enhanced chrominance value to reduce said overshoot amount if said enhanced chrominance value of said select pixel is below said local minimum chrominance value.

13. The digital image processing apparatus as set forth in claim 12, wherein said means for enhancing said digital image data of said input digital image comprises a finite impulse response (FIR) filter.

14. The digital image processing apparatus as set forth in claim 12, wherein said means for reducing said enhanced chrominance value to reduce said overshoot amount comprises:

means for multiplying said overshoot amount by a select overshoot reduction parameter to obtain an overshoot reduction amount; and, means for subtracting said overshoot reduction amount from said enhanced chrominance value.

15. The digital image processing apparatus as set forth in claim 14, wherein said means for increasing said enhanced chrominance value to reduce said overshoot amount comprises:

means for multiplying said overshoot amount by a select overshoot reduction parameter to obtain an overshoot reduction amount; and, means for adding said overshoot reduction amount to said enhanced chrominance value.

16. A method of controlling chrominance channel overshoot comprising:

receiving a plurality of pixels of digital image data, each pixel defined in terms of an original luminance value and first and second original chrominance values;

enhancing said digital image data to convert each pixel of said image into an enhanced pixel defined in terms of an enhanced luminance value and first and second enhanced chrominance values;

determining local minimum and local maximum first original chrominance values associated with each enhanced pixel in a select neighborhood about each of said enhanced pixels;

determining local minimum and local maximum second chrominance values associated with each enhanced pixel in a select neighborhood about each of said enhanced pixels;

for each enhanced pixel, comparing said first and second enhanced chrominance values associated with said enhanced pixel to said local maximum and local minimum first and second original chrominance values, respectively, to determine: (i) if said first enhanced chrominance value overshoots one of said local maximum and local minimum first original chrominance values by a first overshoot amount; and (ii) if said second enhanced chrominance value overshoots one of said local maximum and local minimum second original chrominance values by a second overshoot amount;

for each enhanced pixel, if said first enhanced chrominance value overshoots one of said local maximum and local minimum first original chrominance values, adjusting said first enhanced chrominance value to reduce said first overshoot amount;

for each enhanced pixel, if said second enhanced chrominance value overshoots one of said local maximum and local minimum second original chrominance values, adjusting said second enhanced chrominance value to reduce said second overshoot amount.

17. The method of controlling chrominance channel overshoot as set forth in claim 16, wherein said step of enhancing said digital image data comprises applying a finite impulse response (FIR) filter to said digital image data defining each pixel.

\* \* \* \* \*